US005525427A

United States Patent [19]
Griswold et al.

[11] Patent Number: 5,525,427
[45] Date of Patent: Jun. 11, 1996

[54] ABRASION RESISTANT SILICONE WEATHERSTRIP COATING

[75] Inventors: Roy M. Griswold, Ballston Spa; Shaow B. Lin, Schenectady, both of N.Y.

[73] Assignee: General Electric Company, Waterford, N.Y.

[21] Appl. No.: 401,053

[22] Filed: Mar. 8, 1995

[51] Int. Cl.$^6$ ........................................ B32B 9/04
[52] U.S. Cl. ..................... 428/447; 524/837; 524/838; 524/839; 528/17; 528/18; 528/19
[58] Field of Search ..................... 524/837, 838, 524/839; 528/17, 18, 19; 428/447

[56] References Cited

U.S. PATENT DOCUMENTS

| | | |
|---|---|---|
| 2,930,809 | 3/1960 | Jex et al. . |
| 2,947,771 | 8/1960 | Bailey . |
| 3,045,036 | 7/1962 | Jex et al. . |
| 3,598,853 | 8/1971 | Friedman et al. . |
| 3,890,269 | 6/1975 | Martin . |
| 4,233,428 | 11/1980 | Endo . |
| 4,252,933 | 2/1981 | Sumida . |
| 4,600,436 | 7/1986 | Traver et al. . |
| 4,987,204 | 1/1991 | Murachi . |
| 5,086,110 | 2/1992 | Xiao et al. . |
| 5,169,896 | 12/1992 | Coogan et al. . |
| 5,366,808 | 11/1994 | Yip . |

OTHER PUBLICATIONS

McCutcheons Emulsifers & Detergents, North American Edition, 1982, pp. 322–327.

"Polyurethane–Urea Anionomer Dispersions", by Xiao et al., Journal of Applied Polymer Science, vol. 54, pp. 1643–1650, 1994.

*Primary Examiner*—Melvyn I. Marquis

[57] ABSTRACT

A water reducible weatherstrip coating comprising a two or three component system comprising a silicone emulsion base, a bath-life extender, and a crosslinking composition.

22 Claims, No Drawings

ABRASION RESISTANT SILICONE WEATHERSTRIP COATING

This invention relates to a coating composition system suitable for use as weatherstrip coating. In particular, it relates to silicone compositions that are water reducible and, when applied to common weatherstrip materials such as EPDM rubber, provide a coating that possesses properties such as low coefficient of friction, improved abrasion resistance and freeze-release, as well as extended bath life.

BACKGROUND OF THE INVENTION

A wide variety of OH-terminated diorganosiloxane coatings having freeze-release properties are known and are readily available. Most of the coatings are used to treat paper and other porous substrates such that the adhesion of the coatings to the substrates is primarily based on physical anchorage. On non-porous substrates such as plastics and rubber surfaces, adhesion of these coatings is poor. Furthermore, these coatings have little resistance to removal by abrasion. Because of these problems coating systems for non-porous substrates often require two process steps including the application of a primer followed by the application of the coating material as is taught in for example U.S. Pat. No. 4,233,428 issued to Endo.

One step coating compositions have been taught in U.S. Pat. No. 4,252,933 issued to Sumida and U.S. Pat. No. 4,987,204 issued to Murachi. Although such a coating composition for non-porous substrate provides an abrasion resistant film having good freeze-release properties, it contains large amounts of organic solvents. Typical coating bath contains over 90% solvents such as chlorothene and toluene. Industry is now moving away from coatings containing high levels of organic solvent and the development of a water based or water reducible coating for use as weatherstrip coating is highly desirable.

Water based silicone coatings such as paper releases and polishes are known and available. For example, a water based polish is taught in U.S. Pat. No. 4,600,436 issued to Traver et al. and assigned to General Electric Company. The polish, an amine functional silicone emulsion, is a reaction product of a diorganopolysiloxane fluid, an aminofunctional silane, a polymerization catalyst and water.

U.S. Pat. No. 5,366,808 issued to Yip teaches a one step application for a water reducible silicone system for use as weatherstrip coating. The Yip composition is a three part system including a silicone emulsion base, an adhesion promoter and a catalyst. Although the Yip composition exhibits good freeze release and low coefficient of friction, its abrasion resistance is poor compared to the polyurethane coatings. The bath life of such composition is less than six hours.

None of the above references teaches a one step application for a water reducible silicone system for use as weatherstrip coatings having good abrasion resistant and extended bath life.

Thus, there is a need to provide a water reducible coating composition which can be applied and cured to a non-porous surface such as EPDM based rubber to form a low coefficient of friction, abrasion resistant film having substantially extended bath-life.

There is also a need to make a water reducible weather strip coating that is either a one or two part system.

There is a further need to improve the abrasion resistance to reduce waste, cost and enhance the coating performance.

SUMMARY OF THE INVENTION

According to a broad aspect of the present invention, there is provided a water reducible coating composition for EPDM-based rubber comprising:
(A) an amine functional polysiloxane emulsion;
(B) a crosslinking composition comprising:
   (i) an effective amount of adhesion promoter;
   (ii) a surface active agent; and
   (iii) a catalytic amount of catalyst; and
(C) an effective amount of bath-life extender selected from the group consisting essentially of
   (i) polyurethane dispersion;
   (ii) water-reducible resin; or
   (iii) a mixture of (i) and (ii).
wherein the amine-functional polysiloxane emulsion is blended with the bath life extender in a ratio of from 10:90 to 90:10.

The critical feature that led to this invention is based on the discovery that not only is abrasion resistance of the compositions of the present invention substantially increased, but also the bath-life is extended to at least eighteen hours.

DETAILED DESCRIPTION OF THE INVENTION

The amine functional polysiloxane emulsion (A) acts as the base emulsion in the coating of the present invention. The amine functional polysiloxane emulsion can be prepared either by mechanical or emulsion polymerization techniques familiar to those skilled in the art. In the case wherein the emulsion is prepared by mechanical means the amine functional polysiloxane is prepared in accordance with the process described, for example, in U.S. Pat. No. 2,947,771 issued to Bailey, in which an amine functional silane is equilibrated with a siloxane in the presence of an alkali-metal hydroxide. The emulsion can also be prepared in accordance with the process described in U.S. Pat. No. 3,598,853 issued to Friedman et al., in which an amine functional silane is condensed with a silanol terminated polydiorganosiloxane. Other methods for preparing amine functional polysiloxane fluids are described in U.S. Pat. Nos. 3,890,269 issued to Martin; U.S. Pat. No. 2,930,809 issued to Jex et al. and U.S. Pat. No. 3,045,036 issued to Jex et al. The amine functional polysiloxanes described in these references and their methods of preparation are incorporated herein by reference. The aforementioned amine functional polysiloxanes are emulsified using surfactants and techniques familiar to those skilled in the art. In the case wherein the amine functional polysiloxane emulsion is prepared by an emulsion polymerization reaction, the process as described for example in U.S. Pat. No. 4,600,436 issued to Traver et al., which is an emulsion polymerization reaction product of a relatively low molecular weight diorganopolysiloxane and an amine functional silane. The amine functional polysiloxanes described in this reference and the method of preparation are incorporated herein by reference. The amine functional polysiloxanes of the present invention can be either macroemulsion or microemulsion in form. The amine content of the amine functional polysiloxane emulsion being greater than 0.1 milliequivalent per gram of sample, and preferably greater than 0.2 milliequivalent per gram of sample.

Composition (B) provides crosslinking, adhesion promotion and water repellency for the coating of the present invention and is comprised of:

(i) an adhesion promoter;

(ii) a surface active agent; and (iii) a catalytical amount of catalyst.

In a preferred embodiment, composition (B) further comprises an organic solvent.

The adhesion promoter (i) of crosslinking composition (B) used in the present invention is appreciated by the skilled artisan. There is a wide variety of such adhesion promoters known in the art, such as a silicone or organic nonsilicone epoxy resin containing two or more groups expressed by the formula:

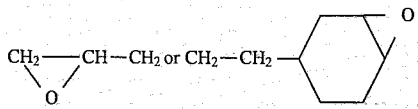

within each of its molecules; an epoxy functional polysiloxane; an epoxy functional silane; or any combination of the above.

Some specific examples of the epoxy resins used in the present invention can be expressed by the general formula:

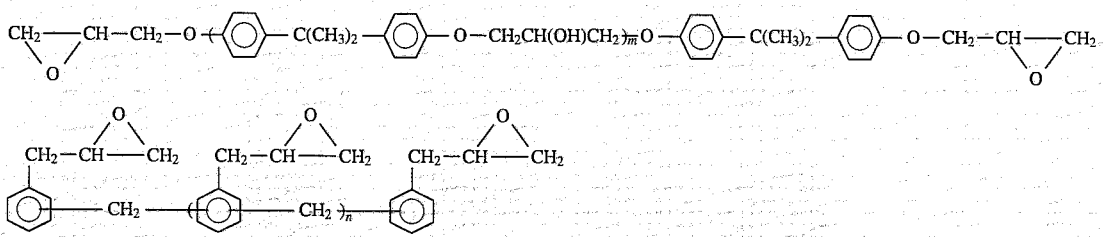

wherein m is an integer in the range of 1 to 15, n is an integer in the range of 0 to 3.

Commercially available adhesion promoters include but are not limited to Epicoat™ 815, 820, 828, 834, 864, 1001, 1004, 1007, 1009, 152 and 154 from Shell Chemical; Araldite™ 6005, 6010, 6020, 6030, 6040 and 6050 from Ciba Co.; Eponic™ R-130, R-133, R-139, R-140, R-144, R-301, R-302, R-304, R-307 from Mitsui; DEN438 from Dow Chemical Co.; ERL 4221 from Union Carbide.

In the case when an epoxy functional polysiloxane is employed, the general formula is:

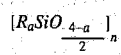

where R denotes a monovalent radical that can be selected from a hydrogen atom and a monovalent hydrocarbon radical which is substituted or nonsubstituted such that out of all the R's in a single molecule, at least two are monovalent hydrocarbon radicals that contain a glycidoxy group and/or an epoxy cyclohexyl group, a is an integer ranging from 1 to 3, and n denotes integer of from 10 to 5,000.

The case where the adhesion promoter (i) of crosslinking composition (B) used in the present invention is an epoxy functional silane which it can be represented by the general formula:

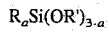

wherein R and a are defined as above and R' is a substituted or nonsubstituted monovalent radical. Examples include but are not limited to gamma-glycidoxypropyltrimethoxysilane, (gamma-glycidoxypropyl) methyl diethoxysilane, bis(3-glycidoxypropyl) tetramethyldisiloxane, 2(3,4-epoxycyclohexyl) ethyltrimethoxysilane.

The amount of epoxy containing adhesion promoter (i) as described above in composition (B) is in the range of from 5 to 50%, preferably from 5 to 35%, and more preferably 10 to 25% based upon the siloxane solids in composition (B).

In order to improve the wetting and/or adjust the adhesion of the coating composition, an effective amount of a surface active agent (ii) can be added in the coating composition of the present invention. The suitable surface active agents include but are not limited to surfactant or wetting agents. As will be appreciated by the skilled artisan, there are a wide variety of such surface active agents available. They are conveniently listed, by class, in "McCutcheons Emulsifiers & Detergents," North American Edition, 1982, pp. 322–327, expressly incorporated herein by reference.

The surface active agents used in the present invention include is both high molecular weight (average molecules weight of 500 or more) and low molecular weight (average molecular weight of less than 500) nonionic, amphoteric, cationic and anionic surfactants. Polymeric surfactants can also be employed.

Exemplary nonionic surfactants include, for example, organo materials which contain groups of varying polarity whereby one part of the molecule is hydrophilic and the other is hydrophobic. Examples of such materials include polyols, polyethers, polyesters and polyhalides. The preferred surfactants used in the present invention can be represented by the formula:

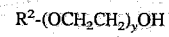

where $R^2$ is a nonylphenyl or an octylphenyl group or an alkyl group having 13 to 15 carbon atoms and y is in the range of from 4 to 40. The most preferred surfactants are the Triton™ line from Rohm & Haas such as Triton™ X405 and Triton™ N401 or Renex™ 36 from ICI. Other noniomic surfactants include fluorosurfactant such as FC-129, FC-170C. and FC-430 manufactured by Minnesota Minning and Manufacturing, and alkynolsurfactant such as Surfynol™ 61, 104H, 465 and 485 manufactured by Air Products and Chemicals, Inc.

Exemplary anionic surface active agents include but are not limited to those containing a carboxylate group attached directly to a hydrophobic group, or, in the alternative, where there is an intermediate functionality such as an ester, amide, sulfonamide, or the like. Other useful surfactants include anionic agents derived from sulfuric or sulfonic acids in which the hydrophobic groups are selected from aliphatic or aromatic groups of varying polarity, such as halides, ether and/or ester groups. A preferred anionic surfactant is sodium lauryl sulfate.

Exemplary cationic surfactants are those derived from amino groups (including primary; secondary; and/or tertiary amine (salts) wherein the hydrophilic character is obtained by groups of varying polarity. Also exemplary are materials such as quaternary ammonium compounds, guanidine, and their onium salts.

Combination of such surface active agents can also be used. An amount of surface active agents is used which will effect the formation of an emulsion upon the addition of water as would be understood by those skilled in the art. In the preferred embodiment, the surface active agent is added to crosslinking composition (B) in an amount in the range of from 1–15% by weight based on composition (B).

An effective amount of catalyst is added to the crosslinking composition (B) in order to catalyze the condensation reaction during the curing process of the coating. Suitable catalysts include organometallic compounds. The preferred catalysts are organo tin compounds such as dibutyl tin dilaurate, dibutyl tin dioctoate, dimethyl tin dineodecanoate, dibutyl tin bis(acetylacetonate), dimethylhydroxy tin oleate, or dibutyl tin oxide. The most preferred catalysts include dibutyltin oxide, dimethyltin dineodecanoate, and dibutyltin dilaurate. Other metallic salts such as zinc octoate, zirconium octoate titanium compound such as titanium naphthenate or manganese naphthenate can be employed as the condensation catalyst but are not as effective in terms of cure speed. The organo tin compound is added in an amount effective to catalyze the condensation reaction as would be appreciated by those knowledgeable in the art. The amount of organo tin compound in the preferred embodiment of the present invention ranges from 0.01 to 3% by weight of the total coating solids.

One of the most important features of this invention is the bath-life extender (C). As discussed above, the conventional silicone coating composition systems suitable for use as weatherstrip coatings have very short bath-life. Applicants have surprisingly found that by adding certain bath-life extenders into such silicone coating composition systems, the bath life can be substantially extended. Suitable bath-life extenders used in the invention include a polyurethane dispersion (i), a resin emulsion (ii), and a mixture thereof.

Aqueous polyurethane dispersions (i) of bath-life extender (C) can be obtained by dispersing in water a water-dispersible polyurethane. The preparation of aqueous dispersions of polyurethane has been well described in the prior art such as U.S. Pat. No. 5,169,895 issued to is Coogan et al., U.S. Pat. No. 5,086,110 issued to Xiao et al. and "Polyurethane-Urea Anionomer Dispersions, by Xiao et al., Journal of Applied Polymer Science, Vol. 54, pp. 1643–1650, 1994, all of which are incorporated herein as references.

The preferred water reducible polyurethanes suitable for the coating composition are the reaction products of the following components:

a) a polyisocyanate having at least two isocyanate (—NCO) functionalities per molecule. Suitable polyisocyanates include diisocyanate monomers, oligomers cited in the following. There are aliphatic polyisocyanates such as 1,6-hexamethylene diisocyanate (HMDI) and its isocyanurate-containing derivatives; cycloaliphatic polyisocyanates such as 4,4'-mthylene bis(cyclohexyl isocyanate) ($H_{12}$MDI), cyclohexane 1,4-diisocyanate and its isocyanurate derivatives; aromatic polyisocyanates such as 4,4'-diphenylmethane diisocyanate (MDI), xylene diisocyanate (XDI), toluene diisocyanate (TDI), isophorone diisocyanate (IPDI), 1,5-naphthalene diisocyanate (NDI), 4,4',4"-triphenylmethane diisocyanate, and their isocyanurate-containing derivatives. Mixtures or the reaction products of polyisocyanates can be used. Polyisocyanates contain the reaction products of these diisocyanate including isocyanurate, urea, allophanate, biuret, carbodiimide, and uretonimine entities are also included.

b) a polyol having at least two hydroxy functionalities per molecule and a molecular weight ranging from 250 to 5000 g/mole. The polyol may be selected from those commonly found in polyurethane manufacturing. They include hydroxy-containing or terminated polyesters, polyethers, polycarbonates, polythioethers, polyolefins, and polyesteramides. Suitable polyester polyols include hydroxy-terminated reaction products of ethylene glycol, propylene glycol, diethylene glycol, neopentyl glycol, 1,4-butanediol, furan dimethanol, polyether diols, or mixtures thereof, with dicarboxylic acids or their ester-forming derivatives. Polyesters obtained by the polymerization of lactones, such as caprolactone may also be used.

Polyether polyols useful for the polyurethane reaction include products obtained by the polymerization of a cyclic oxide including ethylene oxide, propylene oxide or tetrahydrofuran, or mixtures thereof. Polyether polyols include polyoxypropylene (PPO) polyols, polyoxyethylene (PEO) polyols, poly(oxyethylene-co-oxypropylene) polyols, polyoxytetramethylene (PTMO) polyols.

Polycarbonate polyols useful for the polyurethane reaction include the products represented by the reaction products obtained by reacting diols such as 1,3-propanediol, 1,4-butanediol, 1,5-pentanediol, 1,6-hexanediol, diethylene glycol with diaryl carbonates such as diphenyl carbonate, or with phosgene, or with aliphatic carbonate, or with cycloaliphatic carbonate. Commercial polycarbonate diols include Duracarb 120 series aliphatic diols and Durocarb 140 series cylco aliphatic diols, both of PPG Industries.

c) a hydrophilic group containing compound containing either two isocyanate or isocyanate-reactive groups per molecule. The hydrophilic group may be of ionic, ionic precursor or nonionic type. The isocyanate-reactive group include those compounds containing active hydrogen such as diols, polyols, diamines, and polyamines.

The hydrophilic groups suitable for the preparation of the water-dispersible polyurethanes include anionic and cationic types. Anionic types include dihydroxy carboxylic acids such as alpha, alphadimethylolpropionic acid (DMPA), diamino carboxylic acids such as 1-carboxy, 1,5-diaminopentane, and 2-(aminoethyl) aminoethyl carboxylic acid; and sulfonate diamines. Anionic type of hydrophilic groups may be the ones that readily form the salts of sulpho, sulfate, thiosulphato, phospho, phosphono, phosphato, or carboxy groups. Examples for cationic type include tertiary amino groups or precursors which readily form salts such as quaternary ammonium, quaternary phosphonium or ternary sulphonium salt groups.

Specific examples of the compounds containing ionic precursor groups and two or more isocyanate-reactive groups include triethanolamine, N-methyldiethanolamine and their oxyalkylation and polyeserification products, trimethylolpropane monophosphate and monosulphate, bis-hydroxylmethyl-phosphonic acid, diaminocarboxylic acids including lysine, cystine, 3,5-diamino benzoic acid, 2,6-dihyroxybenzoic acid, and dihydroxyalkanoic acids including 2,2-dimethylolpropionic acid.

d) a neutralizing compound for the hydrophilic group in c). Diamine or triamine such as diethyl amine or triethylamine is effective in neutralizing carboxylic group and yields a neutralized anionic hydrophilic site on the polyurethane.

e) a chain extender that reacts with the excess or available isocyanate groups in the presence of aqueous medium and leads to a high molecular weight polyurethane aqueous dispersion.

Suitable chain extender for the further polymerization in aqueous medium are well known in the art. Selected examples include ethylene diamine, diethylene triamine, tretheylene tetraamine, propylene diamine, butylene diamine, hexamethylene diamine, cyclohexylene diamine, piperazine, tolylene diamine, xylylene diamine and isophorone diamine.

The built-in hydrophilic groups provide an effective method of creating fine particle size and dispersion stability in water. To obtain a stable dispersion, a content of 0.5 to 5% by weight of hydrophilic groups in the polyurethane is preferred. Hydrophilic groups can be introduced into polyurethane by incorporating the hydrophilic group-bearing diols, diamines, or the combinations during the polymerization of polyurethane.

Preparations of water-dispersible polyurethane are well known in the art. In general an isocyanate-terminated polyurethane prepolymer comprising the reaction product of component a,b,c and optionally d is made, either by a one-step reaction process or step-wise reaction mechanism. The amount of each component required is controlled so the ratio of isocyanate functionality in component a to the total of isocyanate-reactive groups in component b and c fall in the range of 1:1 to 5.0.

The aqueous dispersions of polyurethane can be prepared by dispersing the mixture product of water-dispersible, isocyanate-terminated polyurethane prepolymer and higher functionality polyisocyanates in an aqueous medium, and effecting chain extension with an active hydrogen-containing chain extender in component e).

Conversion of any ionic precursor groups, for example, carboxy groups, in the prepolymer to ionic (salt) groups may be effected before, simultaneously with, or after the addition of the prepolymer to water. The agent described in component d) can be ammonia or a tertiary amine such as triethylamine, triethanolamine or N-methylmorpholine.

The commercially available polyurethanes include but are not limited to Bayhydrol™ 110, Bayhydrol™ 121 and Bayhydrol™ 123 from Miles Industrial Chemical Division of Bayer, Inc. and Cydrothane™ HP-5135 from Cytex Industries Corp.

Another bath life-extender which can be used in the present invention is resin emulsion (ii). The water-reducible resin acts as a water repellent for the coating. Preferred water-reducible resin include but are not limited to methyl methoxypolysiloxane and can be represented by the general formula:

$$R''Si(OR''')_nO_{(3-n)/2}$$

where R" is methyl, phenyl or a combination thereof, R''' is alkyl having 1 to 4 carbons, n ranges from 0.3 to 0.7. Preferably, n is in the range of from 0.4 to 0.5. The methyl methoxypolysiloxane can be in solution in an organic solvent. U.S. Pat. No. 2,810,704 issued to Krantz provides a more complete description of methyl methoxypolysiloxane resin and/or solution. Combination of such water-reducible resin or a mixture of a polyurethane dispersion and a water-reducible resin can also be used.

The water reducible coating composition of the present invention can be enhanced in its film forming properties by the addition of an effective amount of organic solvent. The organic solvent is one or more of an aliphatic hydrocarbon or an aromatic hydrocarbon such as Aromatic 150, glycol ethers such as Dowanol™ DPM or a glycol ether/alcohol blend. The solvent may be partly originated from the methyl methoxypolysiloxane resin solution (ii) in (C). In the preferred embodiment, organic solvent is also included directly in the cross-linking composition (B). In crosslinking composition (B), the organic solvent is preferably present in the range of from 10 to 70% by weight of composition (B).

The coating bath is prepared by a method which will be appreciated by those skilled in the art. In one preferred embodiment the amine functional polysiloxane emulsion (A), typically 20 to 45 weight percent solids of amine functional polysiloxane, is blended with the polyurethane dispersion (C)(i) at a ratio of 10:90 to 90:10 by weight. Crosslinking composition (B) containing the adhesion promoter, the catalyst and the surface active agent is then added and blended to complete dispersion. The blending ratio of (A) to (B) can be varied from 99:1 to 50:50. In another preferred embodiment, the resin emulsion C(ii) is blended with the amine functional polysiloxane emulsion (A) at a ratio of 10:90 to 90:10 by weight. Crosslinking composition (B) is then added and blended to complete dispersion. The blending ratio of (A) to (B) is between 99:1 and 50:50. In a third preferred embodiment, a mixture of polyurethane C(i) and resin emulsion C(ii) is blended with the amine functioned polysiloxane emulsion (A). Crosslink composition (B) is then added and blended to complete dispersion.

Optimum performance of coatings based on the present invention necessitates application to clean, dry substrate. The curing of coatings based on this invention is dependent on time and temperature. The coating may be cured at room temperature in approximately 24 hours, however, cure is typically achieved by exposure to temperature of 100° C. to 150° C. for 3 to 5 minutes.

According to the present invention, silica aerosol, fumed silica, precipitated silica, silica aerogel, powdered quartz, diatomaceous earth, PTFE or UV stabilizers can be added to the above composition as fillers at a concentration of 0.05 to 4 parts by weight based on Composition (A). In order to enhance further slip properties, an inert silicone oil, particularly a polydimethylsiloxane with a high viscosity, can be added thereto.

The present invention is further illustrated by the following examples in which all parts are by weight. The examples are intended to be exemplary only and are not intended to place any limitation on the invention.

EXAMPLE 1

Preparation of Amine functional polysiloxane emulsion:

The following amine functional polysiloxane emulsions were prepared per U.S. Pat. No. 4,606,426 issued to Traver et al.

TABLE 1

| Emulsion No. | wt % Solids | Amine Milliequalent/gm | |
|---|---|---|---|
| A1 | 38 | 0.84 | Emulsion polymerized, macroemulsion |
| A2 | 20 | 0.45 | Emulsion polymerized, microemulsion |
| A3 | 20 | 0.14 | Emulsion polymerized, microemulsion |
| A4 | 20 | 0.16 | Emulsion polymerized, microemulsion |
| A5 | 45 | 0.10 | Emulsion polymerized, microemulsion |

EXAMPLE 2

Preparation of Resin Emulsion.

TABLE 2

| Water-reducible Resin No. | wt % Solids of Emulsion | Structure* |
|---|---|---|
| C1 | 36 | $T_{90}D_{10}$ |
| C2 | 35 | $T_{20}T'_{40}D_{20}D'_{20}$ |
| C3 | 35 | $T_{83}T'_{9}D_{8}$ |

*T is methylsiloxy, T' is phenylsiloxy, D is dimethylsiloxy, D' is diphenylsiloxy, all of which are alkoxy functional.

Heated 600.0 g of a resin solution (60% solids in Aromatic 150) to 40° C. then slowly added a mixture of 180.0 g deionized water, 25.2 g Triton X-114 and 10.8 g Triton X-305 over a 30 minute period with high agitation. The mixture was cooled to a temperature lower than 30° C., inverted to an oil-in-water emulsion using a polytron high shear mixer, and diluted with 184.0 g deionized water. The emulsion was homogenized at 8000 psi to yield a 0.28 micron particle size and a viscosity of 48 cst. The emulsion passed a 30 minute 3000 rpm centrifuge test without creaming or sedimentation being observed.

EXAMPLE 3

Preparing amine functional polysiloxane emulsion/water-reducible resin emulsion blend:

Amine functional polysiloxane emulsion A1 was blended with is water-reducible resin C1 at the ratios detailed in Table 3 below. The blends were centrifuged at 3000 rpm for 30 minutes and no creaming or sedimentation was observed.

Preparing Crosslinking Composition (B):

The crosslinking composition was formulated as follows:

| | |
|---|---|
| organic solvent (Naptha) | 66.0 parts |
| surfactant (Renex 36) | 16.0 parts |
| gamma-glycidoxypropyltrimethoxysilane | 15.0 parts |
| dimethyl tin dineodecanoate | 3.0 parts |

Preparing coating composition:

22.7 parts of the selected amine functional polysiloxane emulsion/water-reducible resin emulsion blend was throughly mixed with 5.0 parts of the crosslinking composition and 40.0 parts of deionized water, and then spray coated onto EPDM rubber preheated two minutes at 150° C. The coating was cured at 150° C. for 3 minutes then cooled overnight. After allowing the coating composition to set 18 hours at room temperature additional EPDM samples were coated as above. The samples were tested using an A.A.T.C.C. model CM-5 crockmeter (Atlas Electric Devices Company) modified by using a 10 mm diameter glass finger, weighted by 900 g and inscribing a 10 cm long path. The results are given in Table 3 below. The number of cycles at which the destruction of the coating on the rubber surface is reported and used as a measure of the abrasion resistant property of the coatings.

TABLE 3

| | | Crockmeter, cycles | |
|---|---|---|---|
| Coating No. | Ratio of A1/C1 | Coating Bath Initial | Coating Bath (18 hours) |
| 1 | 28:72 | 45,000 | >50,000 |
| 2 | 56:44 | >20,000 | >20,000 |
| 3 Comparative Example | 78:22 Control (Yip et al.) | 4,000 3,000 | 35,000 gelled 18 hrs. coating |

EXAMPLE 4

Coating 2 was prepared as in Example 3, except the amine functional polysiloxane emulsions A2 to A5 were substituted for A1. The ratio of amine functional polysiloxane emulsion to water-reducible resin C1 was 56:44. The results are given in Table 4 below:

TABLE 4

| | Amine functional | Crockmeter, cycles | |
|---|---|---|---|
| Coating No. | polysiloxane emulsion | Coating Bath Initial | Coating Bath (18 hrs.) |
| 4 | A2 | 15,000 | >50,000 |
| 5 | A3 | 2,500 | no adhesion |
| 6 | A4 | >50,000 | 5,000 |
| 7 | A5 | >50,000 | >50,000 |

EXAMPLE 5

Coating 2 was prepared as in Example 3, except the water-reducible resins C2 and C3 were substituted for C1. The ratio of amine functional polysiloxane to water-reducible resin was 56:44. The results are given below.

| | | Crockmeter, cycles | |
|---|---|---|---|
| Coating No. | Water-reducible resin No. | Coating Bath Initial | Coating Bath 18 hrs. |
| 8 | C2 | 14,000 | 10,800 |
| 9 | C3 | 5,000 | 20,000 |

EXAMPLE 6

Coatings 8 and 9 were prepared as in Example 5 except amine functional polysiloxane A5 was substituted for A1. The results are given below:

| | | Crockmeter, cycles | |
|---|---|---|---|
| Coating No. | Water-reducible resin No. | Coating Bath Initial | Coating Bath 18 hrs. |
| 10 | C2 | 3,000 | no adhesion |
| 11 | C3 | 6,100 | 35,000 |

EXAMPLE 7

The polyurethane dispersion samples used in this example were Bayhydrol 110™, Bayhydrol 121™, Bayhydrol 123™, which were commercially available polyurethane dispersion from Miles, Inc., a division of Bayer, Inc., and Cydrothane HP-5125™, which is a commercially available polyurethan dispersion from Cytec Corp. To amine functional polysiloxane emulsion of example A1 was added an amount of polyurethene dispersion to provide a ratio of 77.5 to 22:5 mixture. These blends were centrifuged at 3000 rpm for 30 minutes and no creaming or sedimentation were observed.

The crosslinking composition was prepared by blending the formulations below. In this case the crosslinking composition was prepared as two-components.

| Part #1 | Part #2 |
|---|---|
| 48.0 parts Resin Solution* | 15.0 parts Dibutyltin oxide |
| 38.0 parts Naphtha | 65.0 parts Naptha |
| 8.0 parts Renex 36 | 5.0 parts Renex 36 |
| 6.0 parts gamma-glycidoxy-propyltrimthoxysilane | 15.0 parts gamma-glycipropyl-tridoxypropyltri-methoxsilane |

*This resin is a methyl methoxypolysiloxane of structure $T_{90}D_{10}$ wherein T is methylsiloxy and D is dimethylsiloxy groups.

12.9 g of amine functional polysiloxane emulsion/polyurethane dispersion blend was diluted into 40.0 g of deionized water. To this was added 10.0 g of composition B-2 above followed by 1.0 g of composition B-1 above with thorough mixing.

Preheated EPDM substrate samples were pre-heated at 150° C. for two minutes then spray coated with coating bath. Coated samples were then cured for 10 minutes at 150° C. and cooled overnight prior to testing. Each coating composition is designated by the specific polyurethane dispersion incorporated as shown in Table 5.

TABLE 5

| Coating No. | Coating Bath | Crockmeter cycles |
|---|---|---|
| 12 | A1/Bayhydrol™ 110 | >20,000 |
| 13 | A1/Bayhydrol™ 121 | 4,000 |
| 14 | A1/Bayhydrol™ 123 | 7,000 |
| 15 | A1/Cydrothane™ HP-5135 | 4,000 |
| Comparative Example | Control (Yip et al.) | 3,000 |

EXAMPLE 8

Coating 12 was prepared as in Example 7, except the ratio of A1 to Bayhydrol 110 was as shown below in Table 6.

TABLE 6

| Coating No. | Ratio A1/Bayhydrol™ 110 | Crockmeter Cycles | Coefficient of Friction |
|---|---|---|---|
| 16 | 10:5.5 | 26,000 | 0.47 |
| 17 | 10:8.3 | 16,000 | 0.40 |
| 18 | 10:13.9 | 20,000 | 0.35 |
| 19 | 10:19.4 | 30,500 | — |
| 20 | 10:25.0 | 15,000 | 0.39 |
| Comparative Example | Control | 3,000 | 0.42 |

EXAMPLE 9

Coating 12-16 were prepared as in Example 7 except the ratio of amine functional polysiloxane emulsion to polyurethane dispersion was 55:45. These coating compositions were spray coated as prepared then allowed to set at room temperature for 18 hours at which time they were spray coated onto EPDM substrate. In Table 7 below are the results for testing. The control example was gelled at 18 hours and could not be spray coated.

TABLE 7

| Coating No. | Coating Composition | Bath Life Initial | Aged Bath Life 18 hr. |
|---|---|---|---|
| 21 | A1/Bayhydrol™ 110 | 18,000 | 10,000 |
| 22 | A1/Bayhydrol™ 121 | 4,000 | 8,000 |
| 23 | A1/Bayhydrol™ 123 | 7,000 | 4,000 |
| 24 | A1/Cydrothane™ HP-5135 | 9,000 | 10,000 |
| Comparative Example | Control (Yip et al.) | 3,000 | Bath Gelled |

EXAMPLE 10

The resin emulsion C1 was blended with amino functional polysiloxane emulsion A1 of Example A polyurethane dispersion (Bayhydrol™ 110) in a ratio of 38.3:30.0:31.7. This blend was centrifuged for 30 minutes at 3000 rpm and no creaming or sedimentation was observed. The blend after setting at room temperature for three months appears to be uniform.

28.0 parts of the above resin emulsion/amino functional polysiloxane emulsion/polyurethane dispersion blend was diluted into 40.0 parts deionized water. To this was added 5.0 parts of crosslinking composition (B) from example I.

The coating composition was spray coated onto EPDM rubber pre-heated for 2 minutes at 135° C. Coated samples were cured for 10 minutes at 135° C. then cooled overnight before testing. The coating composition was allowed to set at room temperature for 20 hours then additional EPDM substrate samples were coated and cured as above. The following results were obtained.

| Coating No. | | Crockmeter, cycles |
|---|---|---|
| 25 | Bath life, Initial | >50,000 |
| 26 | Bath life, 20 hr. | 38,000 |

What is claimed is:

1. A water-reducible coating composition, comprising:
   (A) an amine functional polysiloxane emulsion;
   (B) a cross-linking composition comprising:
      (i) an organic nonsilicone epoxy resin adhesion promoter;
      (ii) a surface active agent; and
      (iii) a catalytic amount of an organometallic condensation cure catalyst; and
   (C) an effective amount of bath-life extender comprising an aqueous polyurethane dispersion, whereby bath life is extended.

2. The composition of claim 1, further comprising an effective amount of organic solvent.

3. The composition of claim 1, wherein said amine functional polysiloxane emulsion has an amine content of greater than 0.1 milliequivalent per gram.

4. The composition of claim 3, wherein said amine functional polysiloxane emulsion has an amine content of greater than 0.2 milliequivalent per gram.

5. The composition of claim 1, wherein the ratio of said amine functional polysiloxane emulsion to said bath-life extender is from 10:90 to 90:10 by weight.

6. The composition of claim 5, wherein the ratio of said amine functional polysiloxane emulsion to said bath-life extender is from 20:80 to 80:20 by weight.

7. The composition of claim 6, wherein the ratio of said amine functional polysiloxane emulsion to said bath-life extender is from 30:70 to 70:30 by weight.

8. The composition of claim 1, wherein said polyurethane of the polyurethane dispersion is a reaction product of a polyisocyanate, a polyol, a hydrophilic group containing compound, a neutralizing compound and a chain-extender.

9. The composition of claim 1, wherein said organometallic compound is an organo tin compound.

10. The composition of claim 1, wherein said surface active agent comprises nonionic, amphoteric, cationic, anionic materials or polymeric surfactants.

11. A method for extending the bath-life of a water reducible coating composition, comprising the steps of mixing:

(A) an amine functional polysiloxane emulsion;

(B) a cross-linking composition comprising
  (i) an organic nonsilicone epoxy resin adhesion promoter;
  (ii) a surface active agent; and
  (iii) a catalytic amount of an organometallic condensation cure catalyst;

and adding:

(C) an effective amount of a bath-life extender comprising an aqueous polyurethane dispersion, whereby bath life is extended.

12. The method of claim 11, wherein the amine functional polysiloxane emulsion is mixed with the bath-life extender at a ratio of 10:90 to 90:10 by weight.

13. The method of claim 12, wherein the amine functional polysiloxane emulsion is mixed with the bath-life extender at a ratio of 20:80 to 80:20 by weight.

14. The method of claim 13, wherein the amine functional polysiloxane emulsion is mixed with the bath-life extender at a ratio of 30:70 to 70:30 by weight.

15. The method of claim 11 wherein the amine functional polysiloxane emulsion is mixed with the crosslinking composition at the ratio of from 99:1 to 50:50 by weight.

16. The method of claim 11, further comprising the step of adding an effective amount of organic solvent.

17. The method of claim 11, wherein the amine functional polysiloxane emulsion has an amine content of greater than 0.1 milliequivalent per gram.

18. The method of claim 17, wherein the amine functional polysiloxane emulsion has an amine content of greater than 0.2 milliequivalent per gram.

19. The method of claim 11, wherein the polyurethane of the polyurethane dispersion is a reaction product of a polyisocyanate, a polyol, a hydrophilic group containing compound, a neutralizing compound and a chain-extender.

20. The method of claim 11, wherein the organometallic compound is an organo tin compound.

21. The method of claim 11, wherein the surface active agent comprises nonionic, amphoteric, cationic, anionic materials or polymeric surfactants.

22. A structure made of EPDM-based rubber coated with the water reducible coating composition of claim 1.

* * * * *